United States Patent
Hosotani et al.

(10) Patent No.: US 6,366,480 B2
(45) Date of Patent: Apr. 2, 2002

(54) SWITCHING POWER SUPPLY APPARATUS (75) Inventors: Tatsuya Hosotani; Hiroshi Takemura, both of Muko; Yasuji Okamoto, Nishinomiya, all of (JP)

(73) Assignee: Murata Manufacturing Co. (JP)

( * ) Notice: Subject to any disclaimer, the term of this patent is extended or adjusted under 35 U.S.C. 154(b) by 0 days.

(21) Appl. No.: 09/797,963

(22) Filed: Mar. 2, 2001

(30) Foreign Application Priority Data

Mar. 3, 2000 (JP) ........................................ 2000-059393

(51) Int. Cl.$^7$ ............................................. H02M 3/335
(52) U.S. Cl. ................................ 363/21.14; 363/21.16; 363/21.02
(58) Field of Search ......................... 363/21.14, 21.01, 363/20, 21.16, 21.02, 21.03

(56) References Cited

U.S. PATENT DOCUMENTS

| | | |
|---|---|---|
| 3,986,097 A | 10/1976 | Woods |
| 4,945,465 A * | 7/1990 | Marinus et al. ............... 363/89 |
| 4,958,268 A | 9/1990 | Nagagata et al. |
| 5,430,633 A | 7/1995 | Smith |
| 6,061,252 A | 5/2000 | Hosotani |
| 6,069,804 A * | 5/2000 | Ingman et al. ............... 363/131 |

FOREIGN PATENT DOCUMENTS

| | | |
|---|---|---|
| JP | 63100993 | 6/1988 |
| JP | 5137326 | 6/1993 |
| JP | 9271167 | 10/1997 |

* cited by examiner

*Primary Examiner*—Shawn Riley
(74) *Attorney, Agent, or Firm*—Ostrolenk, Faber, Gerb & Soffen, LLP (57) ABSTRACT

A switching power supply apparatus has a transformer having a primary winding and a secondary winding, a first switching element connected in series with the primary winding, a first control circuit for controlling the on-time of the first switching element whereby the output is controlled, and a rectification circuit for rectifying the output from the secondary winding, whereby input voltage is applied to the first winding when the first switching element is on and causes current to flow therein so that energy is stored in the transformer, and the energy stored in the transformer is released as electric current from the secondary winding when the first switching element is off, and the current is rectified in the rectification circuit to obtain an output. The rectification circuit comprises a rectification diode, a second switching element connected in parallel to the rectification diode, a second switching element drive winding provided in the transformer to generate a voltage which causes the second switching element to be on, and a second control circuit for turning on the second switching element by use of a voltage from the second switching element drive winding, and turning off the second switching element after a time determined by a predetermined time constant by use of a further switching element connected to the control terminal of the second switching element.

30 Claims, 8 Drawing Sheets

SWITCHING POWER SUPPLY APPARATUS

BACKGROUND OF THE INVENTION

1. Field of the Invention

The present invention relates to a switching power supply apparatus in which output produced by switching D.C. input on the primary side is rectified in a rectification circuit, and is supplied to a load, and more particularly, to an energy-storage type switching power supply apparatus in which a rectification diode and a switching element in parallel to the rectification diode are connected in the rectification circuit.

2. Description of the Related Art

Conventionally, for switching power supply apparatus which can satisfy demands for high quality and can be formed at relatively low expenditure, the RCC (ringing choke converter) as disclosed in (1) Japanese Unexamined Utility Model Publication No. 63-100993 has been employed. In such ringing choke converters and flyback converters, a diode is connected to a rectification circuit on the secondary side of a transformer. That is, when a switching element on the primary side of the transformer is on, input voltage is applied to the primary winding, allowing current to flow, so that energy is stored in the transformer. When the switching element is off, the energy stored in the transformer is released from the secondary winding in the form of current. The current is rectified and smoothed to obtain an output voltage. The output voltage is stabilized by control of the on-time of the switching element.

(2) A switching power supply apparatus disclosed in Japanese Unexamined Patent Application Publication No. 2-261053 has the following constitution. A switching means is connected in parallel to a rectification diode on the secondary side of a transformer. An output voltage obtained by rectification in the rectification circuit and smoothing is applied via the switching means to the secondary winding of the transformer, and energy is regenerated in the primary.

(3) In a switching power supply apparatus disclosed in Japanese Unexamined Patent Application Publication No. 9-271167, a synchronous rectifier comprising a MOSFET is connected to a rectification circuit on the secondary side of a transformer. When energy stored in the transformer is released in the form of current, the MOSFET is turned on, whereby the rectification loss is reduced. Moreover, the arrangement is such that the MOSFET is driven by means of a drive winding provided in the transformer.

However, the above-mentioned switching power supply apparatus of (1) to (3) have the following inconveniences.

(1) Japanese Unexamined Utility Model Publication No. 63-100993.

In the method using only the diode as the rectifying means, the forward voltage drop of the diode is large (about 0.6V). This causes the problem that a loss generated by the voltage drop reduces the efficiency and increases the temperature of the diode itself.

(2) Japanese Unexamined Patent Application Publication No. 2-261053.

In this switching power supply apparatus, rectification on the primary side of the transformer is controlled with the switching means connected in parallel to the diode, so that the output voltage is stabilized. Therefore, the magnetic flux change range is constant, irrespective of the output power, and the maximum exciting energy is stored in the transformer at all times. Thus, the conduction loss and the core loss of the transformer, and moreover, a loss caused by the regeneration of current is large, and especially, the efficiency at light-loading and non-loading is reduced. Moreover, described is an example, in which the current to be regenerated in the secondary winding is made constant, so that the magnetic flux amplitude at light-loading is decreased. In this case, it is necessary to provide a circuit for detecting current to be returned to the secondary winding, and the power loss caused by the detection circuit is problematic.

(3) Japanese Unexamined Patent Application Publication No. 9-271167.

In this switching power supply apparatus, the MOSFET, which is the synchronous rectifier, is driven only by the drive winding provided in the transformer. Accordingly, the on-time of the MOSFET is determined by the relation between the generation voltage in the drive winding and the threshold voltage at the gate of the MOSFET. In general, generation voltage in a drive winding is determined by a turns ratio, so that it is difficult for the generation voltage to have an optional value. Thus, adjustment of the on-time of the MOSFET is difficult. Moreover, the threshold voltage of MOSFET is not constant and is varied in some range in general. The on-time of the MOSFET is considerably changed, depending on the threshold voltage, and it is very difficult to determined the optimum on-time of the MOSFET. Furthermore, since the MOSFET is turned off by use of a voltage drop caused by spontaneous discharging of the gate terminal voltage of the MOSFET, the turn-off speed of the MOSFET is low, the switching loss is large, and the efficiency is low. The MOSFET is heated.

SUMMARY OF THE INVENTION

In view of the forgoing, the present invention has been devised. It is an object of the present invention to provide a switching power supply apparatus with which a high efficiency, high stabilization, and small-size and light-weight can be realized.

To solve the above-described problems, the switching power supply apparatus comprises a transformer having a primary winding and a secondary winding, a first switching element connected in series with the primary winding, a first control circuit for controlling the on-time of the first switching element whereby the output is controlled, and a rectification circuit for rectifying the output from the secondary winding, whereby input voltage is applied to the primary winding when the first switching element is on and causes current to flow therein so that energy is stored in the transformer, and the energy stored in the transformer is released as electric current from the secondary winding when the first switching element is off, and the current is rectified in the rectification circuit to obtain an output, wherein the rectification circuit comprises a rectification diode, a second switching element connected in parallel to the rectification diode, a second switching element drive winding provided in the transformer to generate a voltage which causes the second switching element to be on, and a second control circuit for turning on the second switching element with a voltage from the second switching element drive winding, and turning off the second switching element after a time determined by a predetermined time constant by use of a further switching element connected to the control terminal of the second switching element.

The switching power supply apparatus in accordance with the present invention is an RCC (ringing choke converter) type switching power supply apparatus, in which energy stored in the transformer when the first switching element is on is released in the form of current to the secondary side when the first switching element is turned off. That is, when the first switching element turns on, an input voltage is applied to the primary winding, allowing current to flow, so that energy is stored in the transformer. When the first switching element turns off, the energy stored in the transformer is released as electric current from the secondary winding. The current is rectified and smoothed to obtain an output voltage. In this case, when the first switching element is turned off, voltage is generated in the second switching element drive winding provided in the transformer, and the voltage is applied to the control terminal of the second switching element, so that the second switching element is turned on to conduct. Then, the current from the secondary winding flows through the rectification diode, and the second switching element connected in parallel to the rectification diode. However, since the second switching element is selected so that the voltage drop of the second switching element is smaller than that in the forward direction of the rectification diode, most of the output current flows in the second switching element. Accordingly, the rectification loss can be reduced.

In general, as the voltage drops of diodes, forward voltages are dominant. Even if the diode is connected in parallel, the voltage drop is scarcely changed. On the other hand, for switching elements such as MOSFETs or the like, voltage drops caused by on-resistance are dominant. Accordingly, the voltage drop can be easily decreased to be smaller than the forward voltage of the diode by parallel connection of the switching element such as a MOSFET or the like.

The switching means connected to the control terminal of the second switching element turns on after the passing of a time-period, determined by a predetermined time constant, from the time when voltage is generated in the second switching element drive winding, whereby the second switching element is turned off. At this time, the reverse voltage is applied to the second switching element and the rectification diode. The capacitive impedance equivalent from the standpoint of the rectification diode and the winding inductance of the transformer resonate with each other, and voltage is applied to the control terminal of the first switching element, so that the first switching element turns on. As described above, the first and second switching elements are alternately turned off and on so as to sandwich a time-period when both of them are off, and the on-time of the first switching element is controlled, correspondingly to the output voltage, whereby the output voltage is stabilized.

When the load is light, the output voltage is applied to the secondary winding of the transformer before passing of the time-period determined by the above predetermined time constant. After the second switching element turns off, the regeneration current flows in the input source via the primary winding of the transformer. The first switching element can be turned off, with the regenerative current, after charges at both ends of the first switching element are discharged, so that the voltage across the first switching element becomes zero. For this reason, the zero-voltage switching operation of the first switching element is enabled, so that the switching loss is reduced. Moreover, if the load becomes light, the first switching element is turned on after the second switching element is turned off after the time-period determined by the above predetermined time constant. Accordingly, the oscillation frequency can be prevented from increasing when the load is light, and thereby, intermittent oscillation or the like which contributes to deteriorated response can be prevented.

Since the rectification loss is reduced, and the switching loss is decreased as described above, a switching power supply apparatus of high efficiency can be realized. Moreover, the on-time of the second switching element is primarily determined by the predetermined time constant. Accordingly, intermittent oscillation can be prevented, in which the oscillation frequency is increased which would contribute to poor response.

According to an aspect, the second control circuit comprises a transistor connected to the control terminal of the second switching element, and an RC time constant circuit connected to the control terminal of the transistor, and is arranged so that output voltage from the second switching element drive winding is applied to the RC time constant circuit.

Since the second control circuit comprises the RC time constant circuit including the transistor, parts such as a control IC or the like are not needed. Inexpensive parts in less number can be used to form the circuit.

According to another aspect, the second control circuit contains a resistor connected between the control terminal of the second switching element and the second switching element drive winding.

A resistor which can delay the time when the second switching element is turned on is provided. Accordingly, given is the time in which charges stored at both ends in the off-period of the second switching element can be discharged. Thus, the second switching element can be zero-voltage switching operated, and the switching loss can be reduced.

According to still another aspect, the second control circuit contains a capacitive impedance connected between the control terminal of the second switching element and the second switching element drive winding.

The delay time of the above explained second control circuit can be produced by means of a resistor connected to the control terminal of the second switching element. By additional connection of the capacitive impedance in series to the resistor, the delay time can be adjusted to be optimum. Furthermore, the capacitive impedance can be singly connected for adjustment of the delay time, instead of the resistor explained above.

Further, DC current flowing from the second switching element drive winding into the control terminal of the second switching element can be cut. Thus, the drive loss can be reduced.

According to still another aspect, the second control circuit contains a time constant adjustment circuit for changing the time constant based on a signal corresponding to the magnitude of a load.

In the above-described aspect, the time constant of the second control circuit is fixed. Accordingly, the turn-off timing of the second switching element is constant, irrespective of the magnitude of the load.

Normally, if the load is light, the direction of the output current is inverted while the second switching element is on, and energy caused by the output voltage is stored in the secondary winding. When the second switching element is turned off, the energy stored in the secondary winding is released as regenerative current in the direction opposite to the ordinary one into the first switching element in the primary. When the regenerative current flows, the charging electric-charges of the parasitic capacitive impedance of the first switching element are released. The first switching element is zero-voltage switched, so that the switching loss is decreased. On the other hand, if the load is heavy, no regenerative current flows, so that a switching loss in the first switching element is generated, due to no flowing of the regenerative current. However, the regenerative energy is energy which is fed from the secondary, and is regenerated in the primary. If the regeneration amount is large, conduction loss is caused in the switching element and the transformer, due to the regenerative current. As a result, the overall efficiency deteriorates.

Accordingly, if the apparatus is configured so that the first switching element causes regeneration current to flow to such a degree that no switching loss is generated, irrespective of the magnitude of the load, the switching loss and the conduction loss can be significantly reduced. The apparatus can be made more efficient. Accordingly, in the present invention, the regeneration amount is caused even at heavy-loading by lengthening the time constant when the load is increased, and to the contrary, the regeneration amount is reduced by shortening the time constant when the load is decreased.

According to still another aspect, a capacitive impedance is connected in parallel to the first switching element or the second switching element.

By connecting the capacitive impedance in parallel to the first or second switching element, the voltage across the switching element at switching can be prevented from changing steeply. Thus, noise reduction can be realized. Moreover, especially by connecting the capacitive impedance in parallel to the second switching element, the reverse recovery loss of the rectification diode can be reduced.

According to still another aspect, a switching power supply apparatus further comprises an inductor connected in series with the primary winding, and a series circuit comprising a capacitor and a third switching element, connected in parallel to the series circuit comprising the inductor and the primary winding, whereby the first control circuit causes the first and third switching elements to turn on and off alternately, so as to sandwich a time-period when both switching elements are off, and controls the on-time of the switching elements, whereby the output is controlled.

In this embodiment, when the first switching element turns off, the second and third switching elements turn on. When the third switching element turns off, resonant current flows in the primary winding, caused by the resonance of the inductor and the capacitor. Then, the third switching element and the first switching element turn on and off, alternately, sandwiching a time-period in which both of the switching elements are off.

According to the invention, the output current has a sinusoidal wave-form in which the wave rises mildly from the zero voltage, due to the resonant current in the primary. For this reason, the current peak value can be reduced as compared with a conventional inverted triangular wave-form. If the sinusoidal wave-form and the inverted triangular wave-form are compared in the same average current level, the effective current can be reduced. Thus, the conduction loss, caused by the rectification circuit, can be decreased. Moreover, by forming a resonant wave-form, that is, designing the conduction time-period of the second switching element and a half of the resonant cycle of the resonant current to be equal to each other, much current can be supplied to the load in the conduction time-period of the second switching element, irrespective of the magnitude of the load, and on the contrary, the current flowing in the rectification diode can be reduced. Therefore, the rectification loss can be further reduced. The switching power supply apparatus using the third switching element is described in U.S. Pat. No. 6,061,252 and Japanese Unexamined Patent Publication No. 11-187664, both of which are assigned to the assignee of the present invention, and the disclosures of which are hereby incorporated by reference.

According to still another aspect, the switching power supply apparatus further comprises an inductor connected in series with the primary winding, and a series circuit comprising a capacitor and a third switching element, connected in parallel to the first switching element, whereby the first control circuit causes the first and third switching elements to turn on and off alternately, so as to sandwich a time-period when both of the switching elements are off, and controls the on-time of the switching elements, whereby the output is controlled.

Also in this embodiment, similarly to the above, the output current wave-form in the secondary can be made a sinusoidal wave-form which is mildly led from the zero current.

According to still another aspect, the switching power supply apparatus further comprises an inductor and a capacitor connected in series with the primary winding, respectively, and a third switching element connected in parallel to a series circuit comprising the inductor, the capacitor, and the primary winding, whereby the first control circuit causes the first and third switching elements to turn on and off alternately, so as to sandwich a time-period when both of the switching elements are off, and controls the on-time of the switching elements, whereby the output is controlled.

Also in this embodiment, similarly to the above, the output current wave-form in the secondary can be made a sinusoidal wave-form which is mildly led from the zero current.

According to still another aspect, the inductor is the leakage inductor of the transformer.

The number of parts can be decreased, and costs can be reduced by use of the leakage inductor of the transformer.

According to still another aspect, the first control circuit controls the third switching element so that it turns off after the second switching element turns off.

In this embodiment, control is carried out so that the third switching element turns off after the second switching element turns off. By this, energy, which is released as output from the primary, is not regenerated in the input source. By this, no energy transfer occurs between the primary and the secondary. The loss caused by the regeneration (circulation loss) can be reduced.

According to still another aspect, the first control circuit, with a bias winding provided in the transformer, controls the on-time of the first switching element based on the output of the bias winding to control the output, and oscillates autonomously.

According to still another aspect, the first control circuit, with a bias winding provided in the transformer, controls the on-time of the first switching element and the third switching element, based on the output of the bias winding to control the output, and oscillates autonomously.

By employing such an arrangement, the autonomous oscillation is enabled. An oscillation IC or the like is not needed, and the number of parts can be significantly reduced. Moreover, the first and third switching elements are driven by use of the magnetic coupling of the transformer. This easily enables a time-period when both of the two switching elements, that is, the first and second switching elements, or the first and third switching elements are off, respectively, is provided, and both of them turn on and off, alternately, sandwiching the time-period. In addition, a loss, due to short-circuit current or the like, caused by simultaneous on times, and damage to the switching element can be prevented.

According to still another aspect, the at least one of the first, second, and third switching elements is a field-effect transistor.

Since at least one of the first, second, and third switching elements comprises a field-effect transistor, the parasitic diode between the drain—source as a diode element, and the parasitic capacitance between the drain—source as the capacitive impedance can be used, respectively.

According to still another aspect, the rectification diode comprises the parasitic diode of the field-effect transistor.

Since the rectification diode comprises the parasitic diode of the field-effect transistor, it is not necessary to prepare the rectification diode of the rectification circuit as a discrete part, and the size and weight can be reduced.

For the purpose of illustrating the invention, there is shown in the drawings several forms which are presently preferred, it being understood, however, that the invention is not limited to the precise arrangements and instrumentalities shown.

DETAILED DESCRIPTION OF EMBODIMENTS OF THE INVENTION

Hereinafter, the preferred embodiments of the present invention are explained in detail with reference to the drawings.

Figure 1:
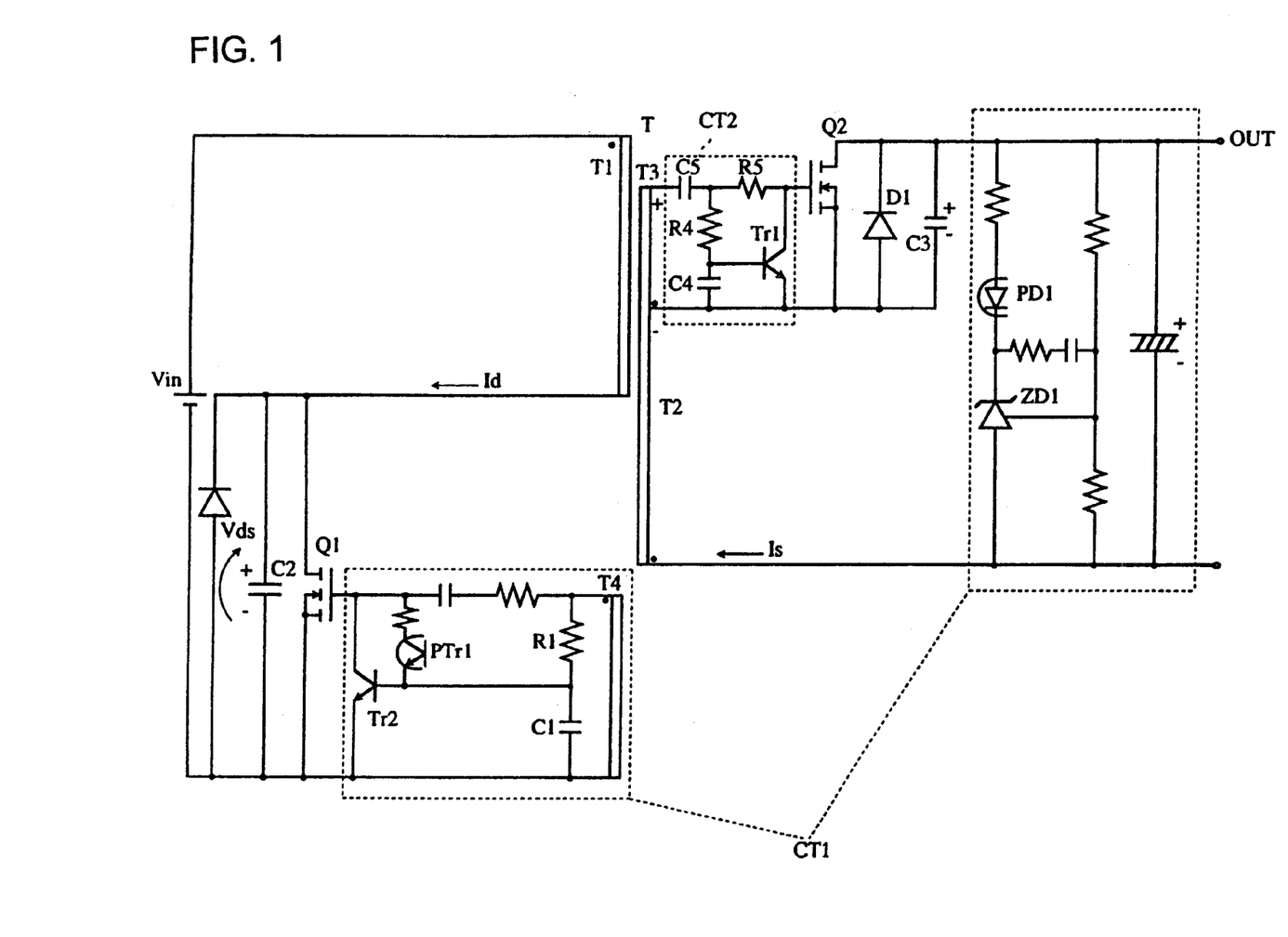
FIG. 1 is a circuit diagram of a switching power supply apparatus according to a first embodiment of the present invention.

FIG. 1 shows a circuit diagram of a switching power supply apparatus according to an embodiment of the present invention.

A transformer T comprises a primary winding T1, a secondary winding T2, a second switching element drive winding T3, and a bias winding T4. A first switching element Q1 is connected to the primary winding T1. This first switching element Q1 may comprise a MOSFET which is a field-effect transistor. A first control circuit CT1 containing the bias winding T4 is composed of a section for detecting a secondary output voltage of the transformer T, and a section for controlling the on-time of the first switching element Q1, based on the voltage. The section for detecting the output voltage comprises a circuit containing a photodiode PD1, a shunt regulator Zd1, and resistors and capacitors as shown. When the output voltage becomes higher, inflow current to the photodiode PD1 is increased. The section for driving the first switching element Q1 contains a transistor Tr2 of which the base is connected to a phototransistor PTr1, and an RC time constant circuit R1, C1 connected to the base of transistor Tr2, and when the output voltage becomes higher, causes the on-time of the transistor Tr2 to occur earlier, so that the on-time of the first switching element Q1 is shorter, whereby the output is reduced.

A second control circuit CT2 is connected to the second switching element drive winding T3. The second control circuit CT2 is connected to the control terminal (gate) of a second switching element Q2 which may comprise a MOSFET which is a field-effect transistor. The second switching element Q2 is connected in parallel to a rectification diode D1. The cathode side of the rectification diode D1 is connected to an output terminal OUT.

Capacitors C2 and C3 are connected in parallel to the first switching element Q1 and the second switching element Q2, respectively. As the capacitors C2 and C3, the parasitic capacitive impedances of the switching elements may be used.

The second control circuit CT2 contains a transistor Tr1 connected to the gate of the second switching element Q2, a RC time constant circuit comprising a resistor R4 connected to the base of the transistor Tr1 and a capacitor C4, a resistor R5 connected in series with the gate of the second switching element Q2, and a capacitor C5.

Vin as a d.c. power source is connected to the primary winding T1. The DC power source Vin may be obtained by rectifying an AC voltage.

Next, the operation of the above-described switching power supply apparatus will be described.

When the first switching element Q1 turns on, an input voltage Vin is applied to the primary winding T1, allowing current to flow, so that energy is stored in the transformer T. When the first switching element Q1 turns off, the energy stored in the transformer T is released as electric current from the secondary winding T2. The current is rectified and smoothed to obtain an output voltage.

In this case, when the first switching element Q1 turns off, a voltage is generated in the drive winding T3 provided in the transformer T, in the positive direction which points up in FIG. 1. A voltage is applied via the capacitor C5 and the resistor R5 to the gate of the second switching element Q2, so that the second switching element Q2 turns on to conduct. Since the voltage drop in the forward direction in the second switching element Q2 is smaller than that in the rectification diode D1, the current from the secondary winding T2 flows through the second switching element Q2, not through the rectification diode D1, and is fed to the output terminal OUT. At the time when voltage is generated in the positive direction in the drive winding T3, current begins to flow in the RC time constant circuit comprising the resistor R4 and the capacitor C4, due to the voltage in the positive direction. When the charging voltage for the capacitor C4 reaches the threshold voltage (about 0.6V) of the transistor Tr1, the transistor Tr1 turns on, so that the voltage at the gate of the switching element Q2 becomes absent, so that the switching element Q2 turns off. Then, if the rectification diode D1 is non-conducting, reverse voltage is applied to the second switching element Q2 and the rectification diode D1 at the timing when the second switching element Q2 turns off. If the rectification diode D1 is conducting, reverse voltage is applied to the second switching element Q2 and the rectification diode D1 at the timing when D1 becomes conducting. The capacitive impedance equivalent from the standpoint of the rectification diode D1 and the winding inductor of the transformer T resonate, so that voltage is applied to the gate of the first switching element Q1, and the first switching element Q1 turns on. The above-described operation is repeated. Thus, the switching elements Q1 and Q2 alternately turn on and off, sandwiching a time-period when both of the switching elements Q1 and Q2 are off, and the on-time of the first switching element Q1 is controlled, correspondingly to the output voltage. Thus, the output voltage is stabilized.

Figure 2:
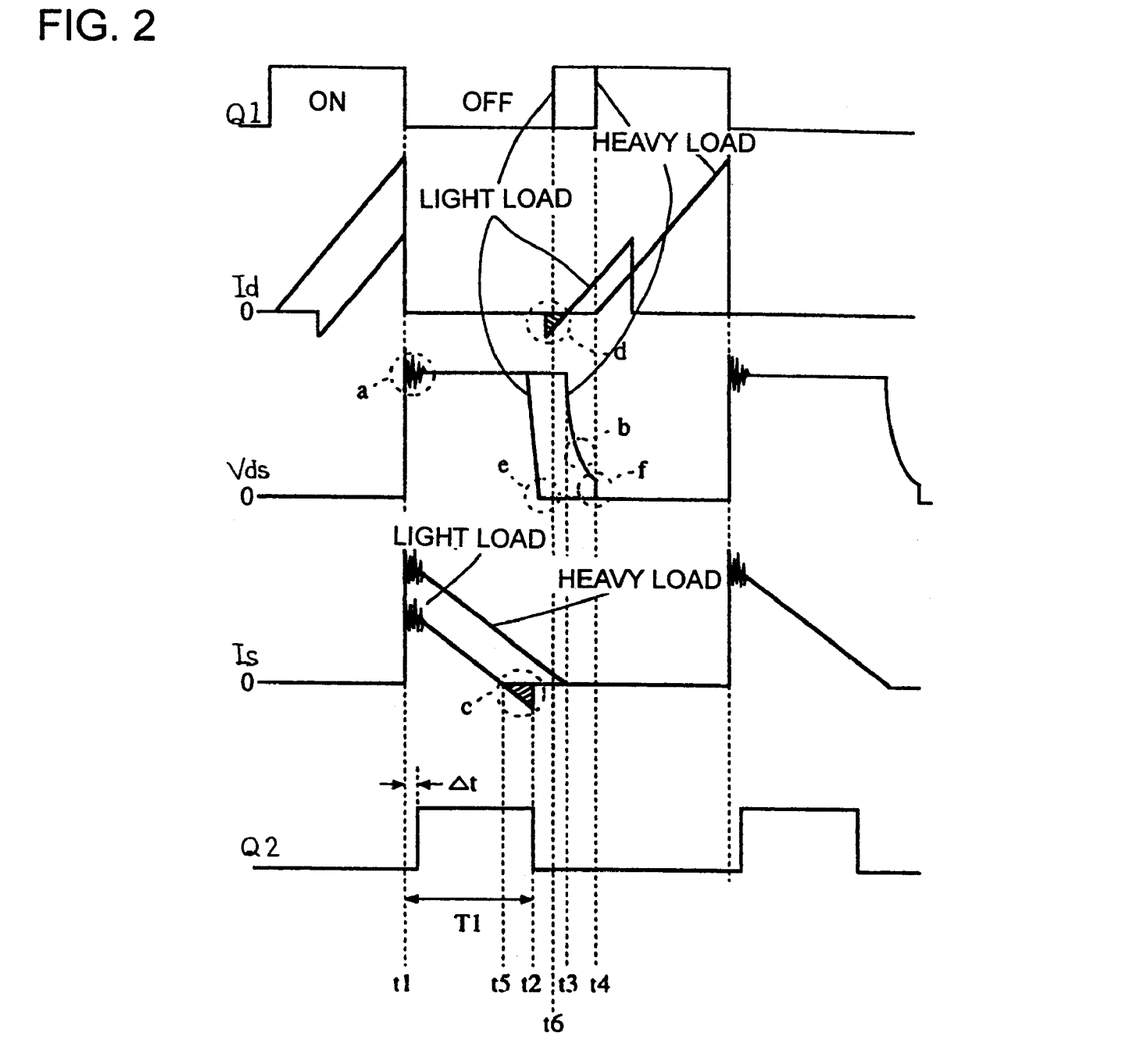
FIG. 2 is an operational waveform chart of the above switching power supply apparatus.
Figure 3:
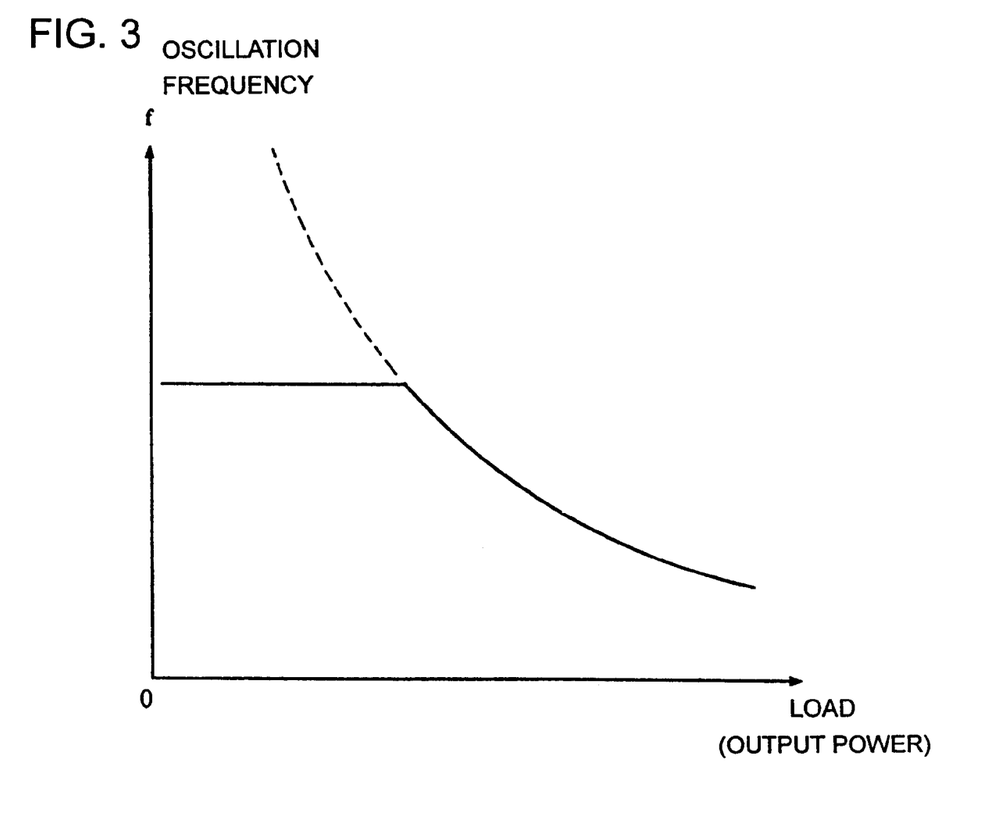
FIG. 3 is a frequency—load characteristic graph of the above switching power supply apparatus.

FIG. 2 is an operational waveform chart of the above-described switching power supply apparatus.

If a Q1 gate signal is turned on, so that the first switching element Q1 turns on, a Q1 drain current Id starts to flow. The first switching element Q1 turns off at timing t1. Then, a Q1 drain—source voltage Vds is established. In this case, the leading gradient is reduced, and surge a is suppressed, since the capacitive impedance C2 is connected between the drain—source of the first switching element Q1. At the timing t1, the energy stored in the transformer T is released as secondary current. At this time, the Q2 gate signal is established Δt later, due to the capacitor C5 and the resistor R5 of the second control circuit CT2, and the input capacitance of the switching element Q2. Therefore, from the timing t1, the secondary current flows in the rectification diode D1 only during Δt. Then, at the time when the Q2 gate signal is established, the second switching element Q2, which comprises a MOSFET having a larger voltage drop, turns on. Therefore, most of the current flows through the second switching element Q2.

While the secondary current flows in the second switching element Q2 as described above, charging current flows into the RC time constant circuit comprising the resistor R4 and the capacitor C5 in the second control circuit CT2. When the time-period required for the capacitor C4 charging voltage to become constant (about 0.6V) has passed, the transistor Tr1 turns on. At this timing t2, the second switching element Q2 turns off. If the load is higher than a rating, the secondary winding current Is further flows through the rectification diode D1 after the second switching element Q2 turns off at the timing t2. At the timing t3 when the secondary winding current Is becomes zero, the Q1 drain—source voltage Vds drops toward zero. At this time, since the capacitive impedance C2 is present, the gradient at which the Q1 drain—source voltage Vds drops is reduced. With this voltage, at the timing t4 when the Q1 gate signal is established, the Q1 drain current Id increases again, and energy starts to be stored in transformer T.

In the above-described operation, in the time-period from t1 to t3, the secondary winding current Is flows in the second switching element Q2 in the time-period of (T1−Δt). Accordingly, as a whole, the rectification loss can be significantly reduced. Moreover, the capacitive impedance C2 is connected between the drain and the source of the first switching element Q1 to reduce the leading and trailing gradients of the Q1 drain—source voltage Vds. Therefore, especially, surge in the portion with noise is decreased. The reduction of surge at the leading edge of the drain—source voltage Vds also results in surge reduction at the leading edge of the current Is.

The length of the above-described time Δt can be set to be appropriate by adjusting the capacitor C5 and the resistor R5 of the second control circuit CT2. Owing to the time Δt, first, the secondary winding current Is flows in the rectification diode D1, and thereby, the second switching element Q2 switches at zero voltage. Accordingly, the switching loss of the second switching element Q2 can be reduced.

On the other hand, when the load is light, the operation is as follows.

In the case where the first switching element Q1 turns on, the Q1 drain current Id increases, and the first switching element Q1 turns off at the time t1, first the secondary winding current Is flows in the rectification diode D1, and after Δt, the Q2 gate signal is established, causing the second switching element Q2 to turn on. Thus, the current Is starts to flow in the second switching element Q2. However, since the load is light, the current Is goes negative at t5, and energy is stored in the transformer T. The current Is becomes zero at the timing t2, that is, the time-period T1 later, which is determined by the RC time constant circuit of the second control circuit CT2. Thus, the energy represented by the hatched area c is stored in the transformer. The energy is regenerated as regeneration energy on the primary side. The secondary winding current Is becomes zero at the timing t2, and then, the Q1 drain—source voltage Vds drops to zero with a gradient caused by the capacitive impedance C2. The Q1 drain current Id, of which the positive—negative polarities are inverted, starts to flow, due to the above-described regeneration energy. The hatched area indicated by d corresponds to this regeneration energy. The charges in the capacitive impedance C2 and the parasitic capacity of the first switching element Q1 are discharged until the Q1 drain current id, of which the positive—negative polarities are inverted, starts to flow. For this reason, the Q1 gate signal is established at timing t6 after the Q1 drain—source voltage Vds becomes zero, as shown by e. Thus, the first switching element Q1 switches at zero voltage.

If the load is heavier than the rating, the first switching element Q1 turns on while the voltage Vds has a potential as shown by f. Therefore, no zero-voltage switching operation is caused. For this reason, when the load is heavy, some switching loss is generated.

As described above, even if the load is light, the timing at which the transistor Tr1 in the second control circuit CT2 turns on is not changed. Therefore, when a light load is applied, the regeneration current is produced, and thereby, a zero voltage switching operation of the first switching element Q1 on the primary side can be realized. Moreover, since the time-period T1 until the Q2 gate signal is removed is not changed, the timing at which the first switching element Q1 turns on does not fail to be after the time-period T1. For this reason, in the case of autonomous oscillation, generally, when the load is light, the switching frequency becomes high. In this embodiment, when a light load is applied, the switching frequency can be suppressed from increasing. As a result of the suppression of the switching frequency from increasing, intermittent oscillation operation, which causes deteriorated response at a light load can be prevented.

In the above-described embodiment, the capacitor C5 is provided in the second control circuit CT2. The capacitor C5 has a function of adjusting Δt shown in FIG. 2. The capacitor C5 does not need to be provided. Even if the capacitor C5 is not provided, the time Δt can be attained, since there is a parasitic capacitance in the gate terminal of the second switching element Q2, provided that the resistor R5 is connected. Moreover, since the second switching element Q2 comprises a MOSFET, the parasitic diode between the source and the drain can also be used instead of the rectification diode D1. Furthermore, instead of the capacitive impedances C2 and C3, the parasitic capacitances of the first and second switching elements Q1 and Q2 comprising MOSFET's, respectively, can be also used.

Figure 4:
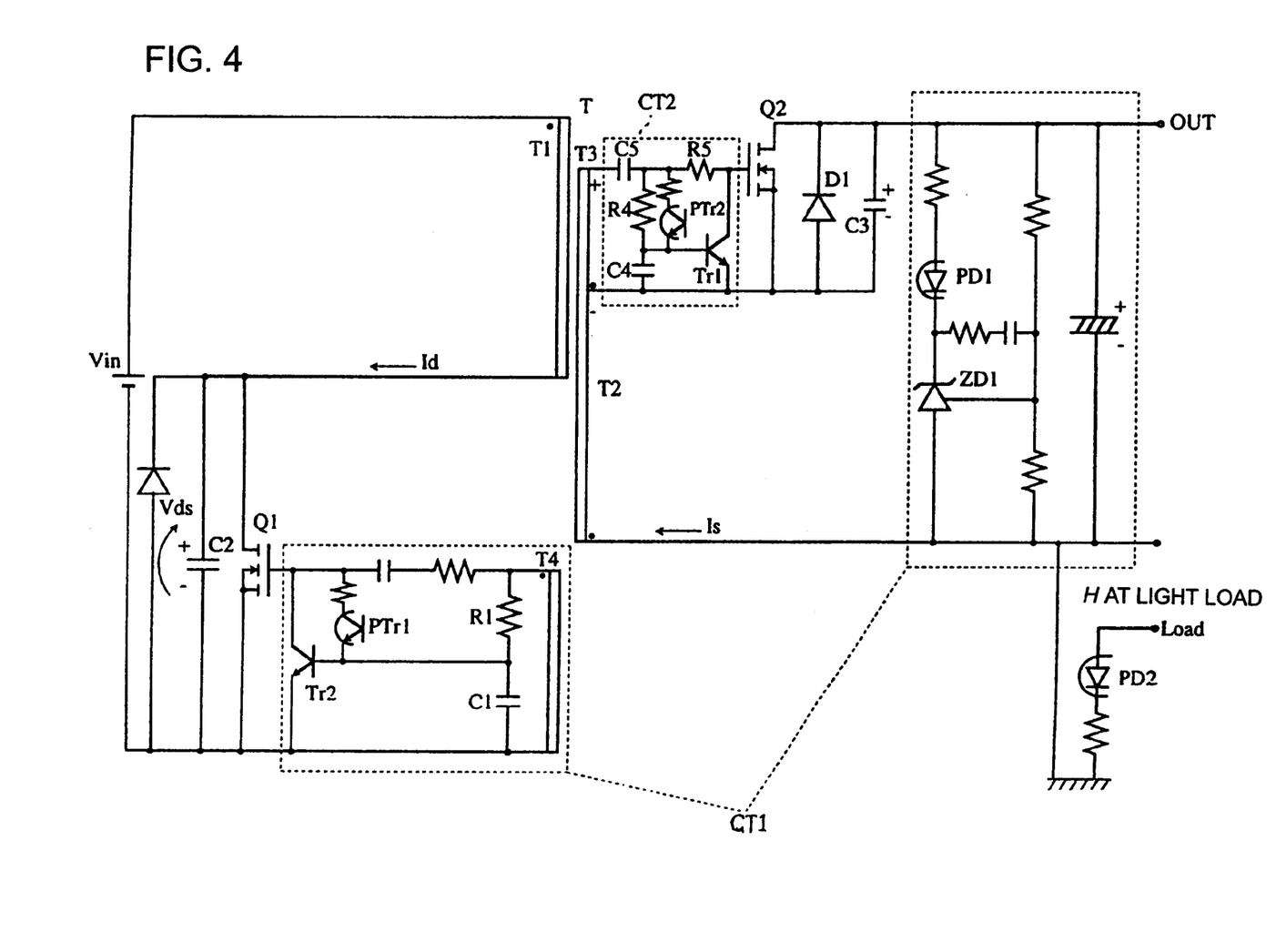
FIG. 4 is a circuit diagram of a switching power supply apparatus according to a second embodiment of the present invention.

FIG. 4 is a circuit diagram of a second embodiment of the present invention.

As regards the arrangement, the apparatus is different from that shown in FIG. 1 in that a phototransistor PTr2 is connected to the transistor Tr1 in the second control circuit CT2, a terminal Load for inputting correspondingly to the magnitude of a load is provided, and a photodiode PD2 is connected to the terminal Load. To the terminal Load, a signal L is input when the load is heavy, and a signal H is provided when the load is light.

With the above-described arrangement, the transistor Tr1 in the second control circuit CT2 turns on later when the load is heavy than when the load is light. Accordingly, the second switching element Q2 turns off later. Thus, even if the load is heavy, the regeneration current shown by c in FIG. 2 flows. As a result, the zero voltage switching of the first switching element Q1 in the primary can be realized for a heavy load. In the case of a light load, the transistor Tr1 turns on earlier. Thus, the second switching element Q2 also turns off earlier. As a result, the regeneration current can be reduced, and the conduction loss, accompanied by the regeneration current, can be suppressed. Accordingly, in FIG. 2, the time-period T1 becomes long when the load is heavy, and becomes short when the load is light. By designing so that an appropriate regeneration current can flow in both of the cases, the zero voltage switching operation of the first switching element Q1 is enabled, and the conduction loss, accompanied by the regeneration current, can be set at a minimum.

Figure 5:
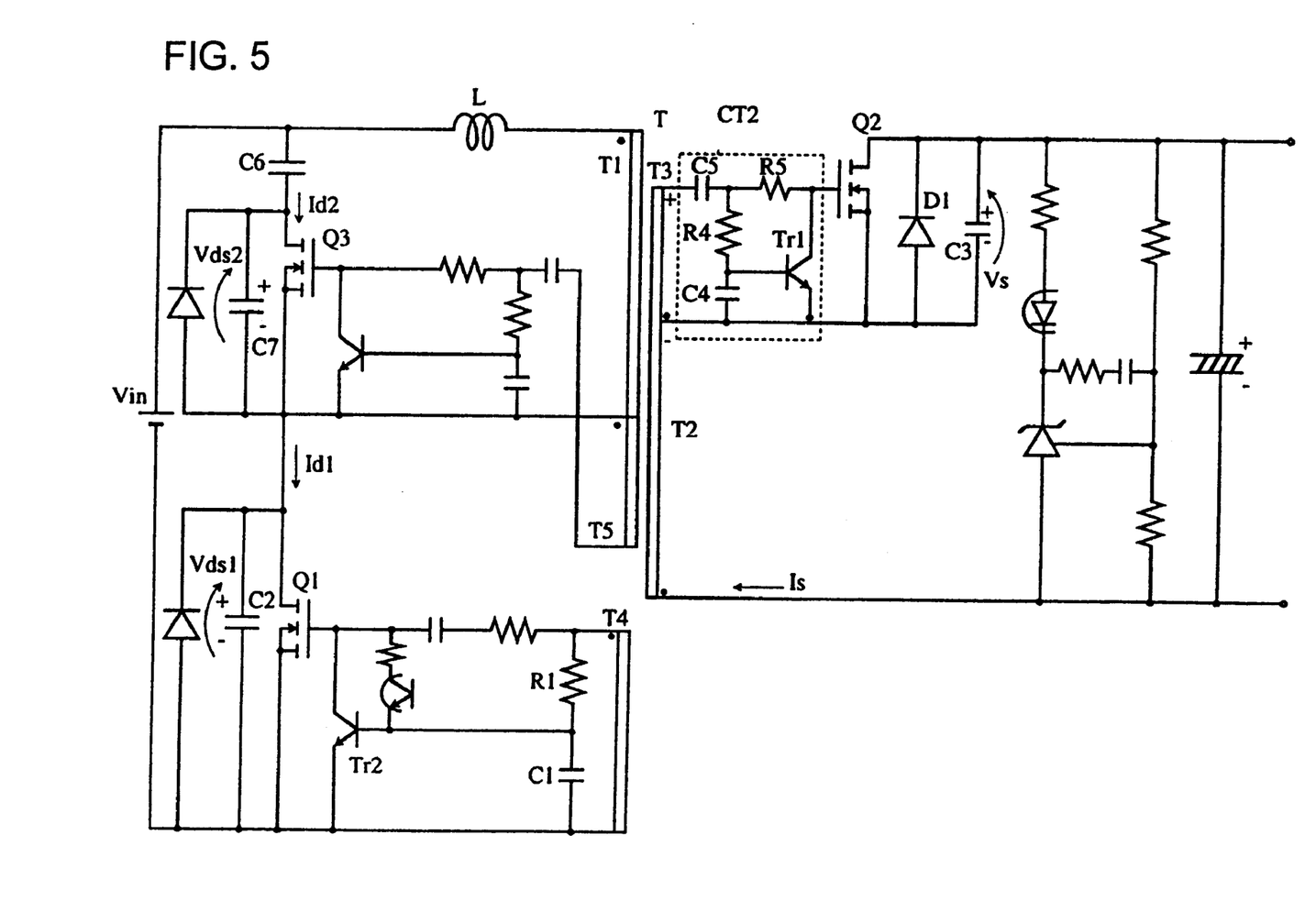
FIG. 5 is a circuit diagram of a third switching power supply apparatus of the present invention.

FIG. 5 shows a switching power supply apparatus according to a third embodiment.

In this switching power supply apparatus, an inductor L is connected in series with the primary winding T1 of the transformer T, and a series circuit comprising a capacitor C and a third switching element Q3 is connected in parallel to a series circuit comprising the inductor L and the primary winding T1. The third switching element Q3 comprises a MOSFET as well as the first and second switching elements Q1 and Q2. For the control terminal (gate), a control circuit is provided, similarly to the first switching element Q1. Furthermore, a bias winding T5 having the reverse polarity to that of the bias winding T4 is provided for the transformer T. Output from the bias winding T5 is applied to the control circuit for the above-mentioned third switching element Q3.

Next, the operation will be described. When the first switching element Q1 turns on, input voltage Vin is applied to the primary winding T1, allowing current to flow therein, so that energy is stored in the transformer T. When the first switching element Q1 turns off, the primary winding voltage of the transformer T is inverted, the inductor L and the capacitor C6 start to resonate on the primary side, and on the secondary side, energy stored in the transformer T is released from the secondary winding T2 as electric current. This current is rectified and smoothed to obtain an output voltage.

When the first switching element Q1 turns off, voltage is generated in the positive direction in the drive winding T3 provided in the transformer T. The voltage is applied to the control terminal (gate) of the second switching element Q2 via the capacitor C5 and the resistor R5. Thus, the second switching element Q2 turns on to conduct.

At this time, on the primary side, the inductor L and the capacitor C6 resonate so that resonance current flows. Therefore, the secondary winding current Is has a mountainous waveform having a mild gradient from the zero current and exhibiting a maximum peak, that is, a sinusoidal waveform, based on the waveform of the resonant current. At this time, first, current flows in the rectification diode D1, caused by the presence of Δt, as shown in FIG. 2. However, since the secondary winding current Is has a mountainous waveform starting from the zero current, the current flowing in the rectification diode D1 during Δt is very small. Most of a large current in the center thereof is passed through the second switching element Q2 having a small voltage drop, and therefore, as a whole, the rectification loss is further smaller as compared with that of the switching power supply apparatus shown in FIG. 1.

The operation of the second control circuit CT2 is the same as that of the above-described switching power supply apparatus. That is, at the time when the positive direction voltage is generated in the drive winding T3, the charging of capacitor C4 in the time constant circuit starts, caused by the positive direction voltage. When the voltage of the capacitor C4 reaches the threshold voltage (about 0.6V) of the transistor Tr1, the transistor Tr1 turns on, and the second switching element Q2 turns off. When the second switching element Q2 turns off, a reverse voltage is applied to the second switching element Q2 and the rectification diode D1, the capacitive impedance equivalent from the standpoint of the rectification diode D1, and the winding inductor of the transformer, resonate with each other. Voltage is applied to the control terminal of the first switching element Q1, and the first switching element Q1 turns on. As described above, the first and second switching elements Q1 and Q2 are alternately turned off and on, so as to sandwich a time-period in which both of them are off, and the on-time of the first switching element Q1 is controlled, correspondingly to the output voltage, whereby the output voltage is stabilized.

Moreover, the first switching element Q1 and the third switching element Q3 are controlled so that the switching elements Q1 and Q3 are alternately turned on and off, sandwiching a time-period when both of them are off, by adjustment or the like of the RC constant of the first control circuit connected to the switching elements Q1 and Q2. The polarities of the bias windings T4 and T5 are reverse to each other. Accordingly, the constants can be set easily so that the switching elements Q1 and Q2 are alternately turned on and off, sandwiching a time-period when both of them are off. The inductor L may comprise the leakage inductor of the transformer T, instead of a separate component.

Figure 6:
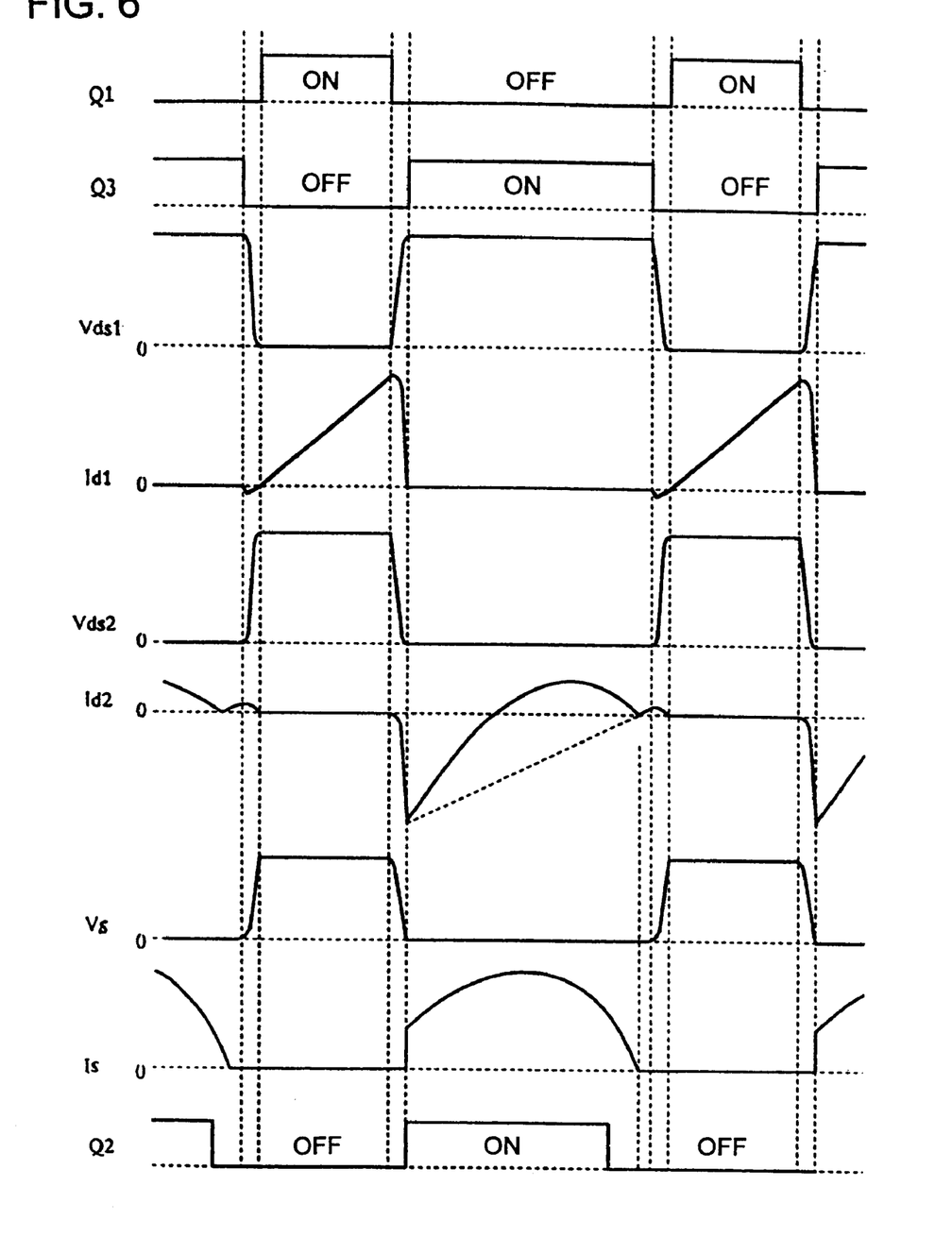
FIG. 6 is an operational waveform chart of the switching power supply apparatus of FIG. 5.

FIG. 6 is a waveform chart of the power supply apparatus shown in FIG. 5. Here, Vds1 designates a voltage across the capacitor C2 connected in parallel to the first switching element Q1, Vds2 a voltage across a capacitor C7 connected in parallel to the third switching element Q3, Id1 a current flowing in the first switching element Q1, Id2 a current flowing in the third switching element Q3, Vs a voltage across the capacitor C3 connected in parallel to the rectification diode D1 in the secondary, and Is a secondary winding current.

As shown in the figure, the secondary winding current Is has a mountainous waveform having a leading edge starting from the zero current and exhibiting a maximum peak value.

Figure 7:
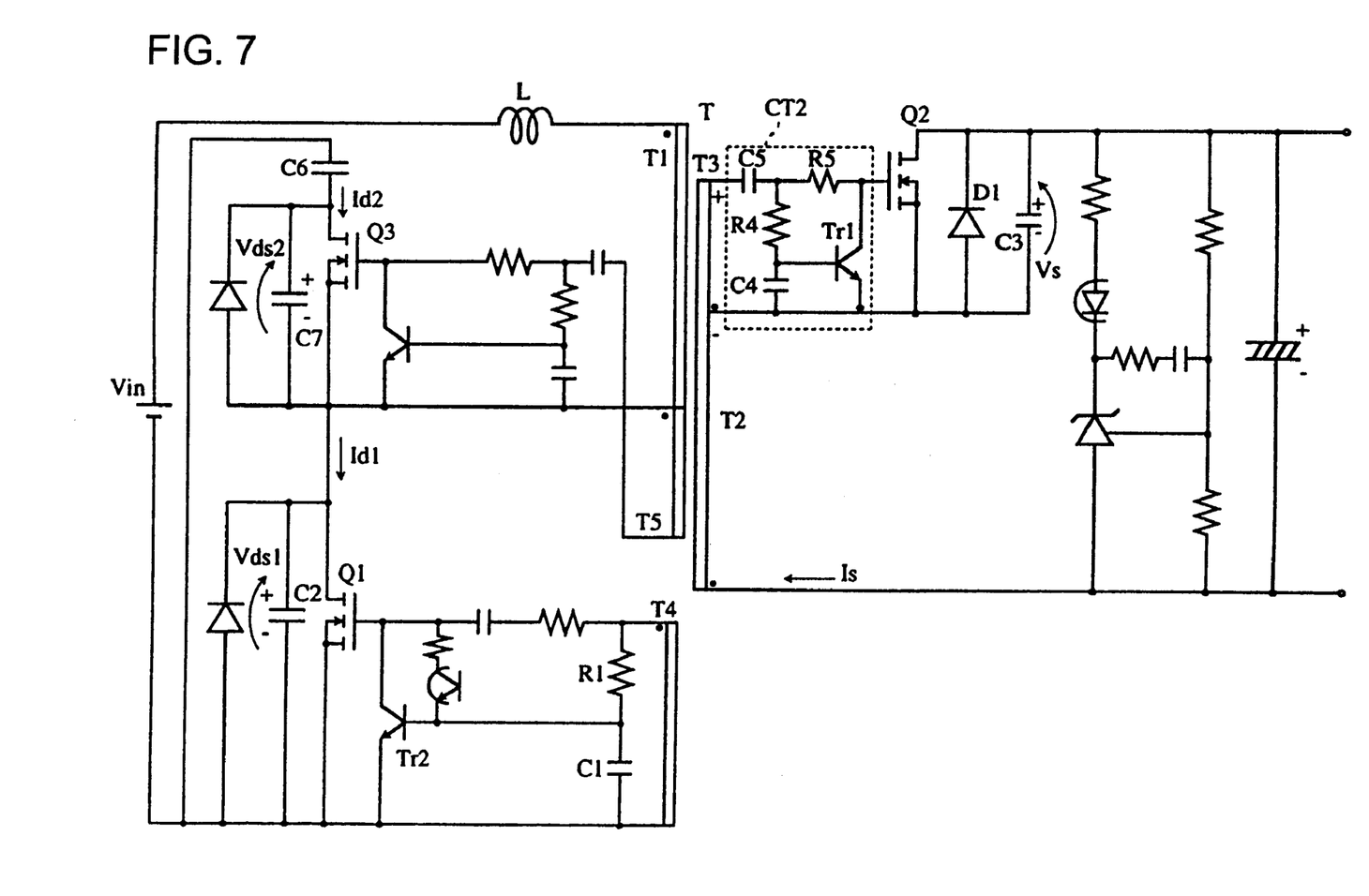
FIG. 7 is a circuit diagram of a fourth switching power supply apparatus of the present invention.

FIG. 7 is a circuit diagram of a switching power supply apparatus according to a fourth embodiment of the present invention.

This switching power supply apparatus carries out the same operation as the switching power supply apparatus shown in FIG. 5 with some difference in arrangement. That is, the inductor L is connected in series with the primary winding T1, and the series circuit comprising the capacitor C6 and the third switching element Q3 is connected in parallel to the first switching element Q1. The operation of this circuit is basically the same as that of the circuit shown in FIG. 5.

Figure 8:
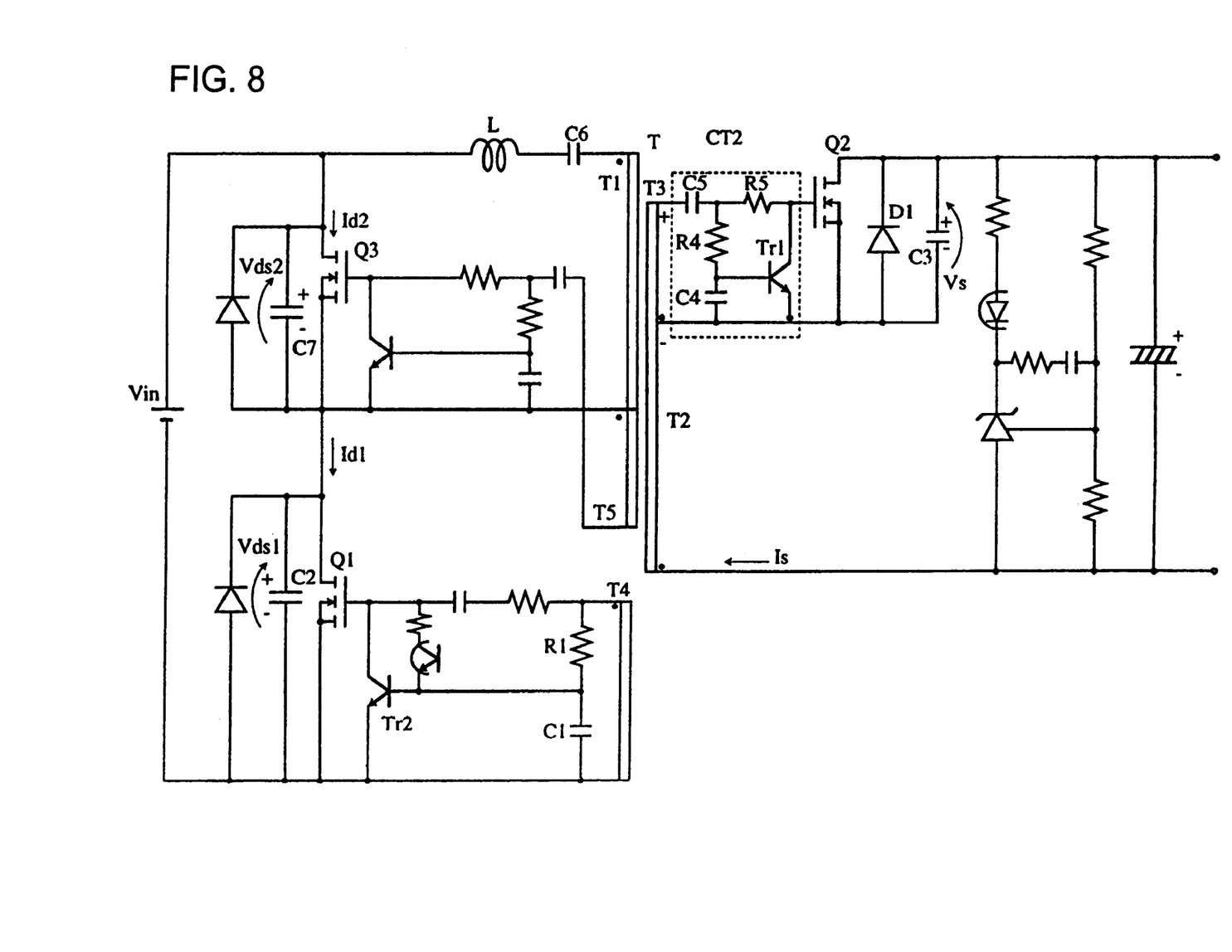
FIG. 8 is a circuit diagram of a fifth switching power supply apparatus of the present invention.

FIG. 8 is a circuit diagram of a switching power supply apparatus according to a fifth embodiment of the present invention.

This switching power supply apparatus carries out the same operation as the switching power supply apparatus of FIG. 5 with some difference in arrangement. That is, the inductor L and the capacitor C6 are connected in series with the primary winding T1, respectively, and the third switching element Q3 is connected in parallel to the series circuit comprising the inductor L, the capacitor C6, and the primary winding T1. The operation of this circuit is basically the same as that of the circuit shown in FIG. 5.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A switching power supply apparatus providing an output voltage comprising a transformer having a primary winding and a secondary winding, a first switching element having an on-time and an off-time, the first switching element connected in series with the primary winding, a first control circuit for controlling the on-time of the first switching element whereby the output voltage is controlled, and a rectification circuit for rectifying an output from the secondary winding, whereby input voltage is applied to the primary winding during the on-time of the first switching element and causes current to flow in the primary winding so that energy is stored in the transformer, and the energy stored in the transformer is released as electric current from the secondary winding when the first switching element is turned off, and the current is rectified in the rectification circuit to obtain said output voltage, wherein the rectification circuit comprises a rectification diode, a second switching element connected in parallel to the rectification diode, a second switching element drive winding provided in the transformer to generate an output voltage which causes the second switching element to be turned on, and a second control circuit for turning on the second switching element by use of a voltage from the second switching element drive winding, and turning off the second switching element after a time determined by a time constant, a further switching element being connected to the control terminal of the second switching element for turning off the second switching element after the time.

2. The switching power supply apparatus of claim 1, wherein the further switching element of the second control circuit comprises a transistor connected to a control terminal of the second switching element, and an RC time constant circuit connected to a control terminal of the transistor, the second control circuit being arranged so that the output voltage from the second switching element drive winding is applied to the RC time constant circuit.

3. The switching power supply apparatus of claim 1, wherein the second control circuit comprises a resistor connected between the control terminal of the second switching element and the second switching element drive winding.

4. The switching power supply apparatus of claim 2, wherein the second control circuit comprises a resistor connected between the control terminal of the second switching element and the second switching element drive winding.

5. The switching power supply apparatus of claim 1, wherein the second control circuit comprises a capacitive impedance connected between the control terminal of the second switching element and the second switching element drive winding.

6. The switching power supply apparatus of claim 2, wherein the second control circuit comprises a capacitive impedance connected between the control terminal of the second switching element and the second switching element drive winding.

7. The switching power supply apparatus of claim 1, wherein the second control circuit comprises a time constant adjustment circuit for changing the time constant based on a signal corresponding to a magnitude of a load connected to the switching power supply apparatus.

8. The switching power supply apparatus of claim 2, wherein the second control circuit comprises a time constant adjustment circuit for changing the time constant based on a signal corresponding to a magnitude of a load connected to the switching power supply apparatus.

9. The switching power supply apparatus of claim 1, wherein a capacitive impedance is connected in parallel to at least one of the first switching element and the second switching element.

10. The switching power supply apparatus of claim 1, comprising an inductor connected in series with the primary winding, and a series circuit comprising a capacitor and a third switching element, connected in parallel to a series circuit comprising said inductor and the primary winding, whereby the first control circuit causes the first and third switching elements to turn on and off alternately, so as to sandwich a time-period when both of the first and third switching elements are off, and controls the on-time of the switching elements, whereby the output voltage of the switching power supply apparatus is controlled.

11. The switching power supply apparatus of claim 1, further comprising an inductor connected in series with the primary winding, and a series circuit comprising a capacitor and a third switching element, connected in parallel to the first switching element, whereby the first control circuit causes the first and third switching elements to turn on and off alternately, so as to sandwich a time-period when both of the first and third switching elements are off, and controls the on-time of the switching elements, whereby the output voltage of the switching power supply apparatus is controlled.

12. The switching power supply apparatus of claim 1, further comprising an inductor and a capacitor connected in series with the primary winding, respectively, and a third switching element connected in parallel to a series circuit comprising the inductor, the capacitor, and the primary winding, whereby the first control circuit causes the first and third switching elements to turn on and off, alternately, so as to sandwich a time-period when both of the first and third switching elements are off, and controls the on-time of the switching elements, whereby the output is controlled.

13. The switching power supply apparatus of claim 10, wherein said inductor is the leakage inductance of the transformer.

14. The switching power supply apparatus of claim 11, wherein said inductor is the leakage inductance of the transformer.

15. The switching power supply apparatus of claim 12, wherein said inductor is the leakage inductance of the transformer.

16. The switching power supply apparatus of claim 10, wherein the first control circuit controls the third switching element so that the third switching element turns off after the second switching element turns off.

17. The switching power supply apparatus of claim 11, wherein the first control circuit controls the third switching element so that the third switching element turns off after the second switching element turns off.

18. The switching power supply apparatus of claim 12, wherein the first control circuit controls the third switching element so that the third switching element turns off after the second switching element turns off.

19. The switching power supply apparatus of claim 1, further comprising a bias winding provided in the transformer, and wherein the first control circuit controls the on-time of the first switching element based on an output of the bias winding to control the output voltage of the switching power supply apparatus, and said first control circuit oscillating autonomously.

20. The switching power supply apparatus of claim 10, further comprising a bias winding provided in the transformer, and wherein the first control circuit controls the on-time of the first switching element and the third switching element based on an output from the bias winding to control the output voltage of the switching power supply apparatus, said first control circuit oscillating autonomously.

21. The switching power supply apparatus of claim 11, further comprising a bias winding provided in the transformer, and wherein the first control circuit controls the on-time of the first switching element and the third switching element based on an output from the bias winding to control the output voltage of the switching power supply apparatus, said first control circuit oscillating autonomously.

22. The switching power supply apparatus of claim 12, further comprising a bias winding provided in the transformer, and wherein the first control circuit controls the on-time of the first switching element and the third switching element based on an output from the bias winding to control the output voltage of the switching power supply apparatus, said first control circuit oscillating autonomously.

23. The switching power supply of claim 1, wherein at least one of the first and second switching elements is a field-effect transistor.

24. The switching power supply apparatus of claim 10, wherein at least one of the first, second and third switching elements is a field-effect transistor.

25. The switching power supply apparatus of claim 11, wherein at least one of the first, second and third switching elements is a field-effect transistor.

26. The switching power supply apparatus of claim 12, wherein at least one of the first, second and third switching element is a field-effect transistor.

27. The switching power supply apparatus of claim 23, wherein the rectification diode comprises a parasitic diode of the field-effect transistor.

28. The switching power supply apparatus of claim 24, wherein the rectification diode comprises a parasitic diode of the field-effect transistor.

29. The switching power supply apparatus of claim 27, wherein the rectification diode comprises a parasitic diode of the field-effect transistor.

30. The switching power supply apparatus of claim 27, wherein the rectification diode comprises a parasitic diode of the field-effect transistor.

* * * * *